US012176686B2

(12) United States Patent
Meyer et al.

(10) Patent No.: US 12,176,686 B2
(45) Date of Patent: Dec. 24, 2024

(54) MULTI-SPARK GAP FOR AN OVERVOLTAGE PROTECTOR

(71) Applicant: Phoenix Contact GmbH & Co. KG, Blomberg (DE)

(72) Inventors: Thomas Meyer, Ottenstein (DE); Viktor Okel, Blomberg (DE); Hannes Sagebiel, Hameln (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 83 days.

(21) Appl. No.: 18/307,126

(22) Filed: Apr. 26, 2023

(65) Prior Publication Data

US 2023/0352915 A1 Nov. 2, 2023

(30) Foreign Application Priority Data

Apr. 28, 2022 (LU) ........................................ 501964

(51) Int. Cl.
*H01T 4/10* (2006.01)

(52) U.S. Cl.
CPC .................................... *H01T 4/10* (2013.01)

(58) Field of Classification Search
CPC .... H01C 7/12; H01T 2/02; H01T 4/06; H01T 4/16; H01T 4/10; H01T 4/12; H01T 4/20; H01T 1/14; H01T 1/00; H01T 1/12; H01T 1/22; H01T 1/20
See application file for complete search history.

(56) References Cited

U.S. PATENT DOCUMENTS

2020/0044419 A1 2/2020 Meyer et al.
2020/0044442 A1 2/2020 Meyer et al.

FOREIGN PATENT DOCUMENTS

DE 102018132088 B3 * 6/2020
EP 2615703 A2 7/2013

OTHER PUBLICATIONS

DE 102018132088 Translation (Year: 2020).*

* cited by examiner

*Primary Examiner* — Bryan R Perez
(74) *Attorney, Agent, or Firm* — Calderon Safran & Wright P.C.; David S. Safran

(57) ABSTRACT

A multi-spark gap for an overvoltage protector, having multiple electrodes and insulation elements arranged between the electrodes, a holding arrangement for mechanical holding and for making electrical contact with the electrodes of the multi-spark gap, wherein the holding arrangement has at least a first electrically conductive clamping element, a second electrically conductive clamping element, and a first electrically conductive connecting element, wherein the electrodes are arranged between the first clamping element and the second clamping element, wherein the first clamping element makes electrical contact with the first electrode of the multi-spark gap, and wherein the second clamping element makes electrical contact with the last electrode of the multi-spark gap, and wherein the at least first connecting element mechanically connects the first clamping element and the second clamping element to one another.

10 Claims, 4 Drawing Sheets

MULTI-SPARK GAP FOR AN OVERVOLTAGE PROTECTOR

BACKGROUND OF THE INVENTION

Field of the Invention

The invention relates to a multi-spark gap for an overvoltage protector, with multiple electrodes and insulation elements arranged between the electrodes.

Description of the Related Art

Multi-spark gaps have been known in a wide variety of designs from the state of the art and are used in the field of overvoltage protection. In particular, overvoltage protectors with spark gaps are used for protecting electrical devices or lines from overvoltages. The overvoltages can be caused by, for example, defects in systems or else also by lightning strikes. Multi-spark gaps have multiple individual spark gaps connected in series, which are formed by multiple stacked electrodes and insulation elements arranged between the electrodes. For example, the electrodes can be made of graphite, and the insulation elements can be produced by thin separating layers made of plastic. For this invention, the types of electrodes and insulation elements are not important factors.

Multi-spark gaps have the advantage that they have an improved power-follow current extinguishing capacity compared to individual spark gaps. The ability to extinguish the power-follow current is improved with an increasing number of individual spark gaps of the multi-spark gap. At the same time, the response voltage of the multi-spark gap increases with an increasing number of individual spark gaps.

In the state of the art, there are various possibilities for connecting the individual spark gaps to form a multi-spark gap. To this end, in most cases, the individual electrodes and insulation units are alternately stacked and secured by holding arrangements. For this purpose, the holding arrangements usually have at least two clamping elements and at least one connecting element, wherein the electrodes and insulation units are arranged between the clamping elements. The clamping elements can usually be braced against one another by the connecting element and thus clamp the electrodes and insulation units.

To influence the ignition behavior of a multi-spark gap, it is known from the state of the art to provide control circuits, wherein a control circuit has multiple passive control elements, and one control element each makes electrical contact with an electrode. In general, the first electrode of the multi-spark gap is not brought into contact. In some configurations known from the state of the art, moreover, the last electrode of a multi-spark gap is also not brought into contact. Frequently, capacitances, namely in particular capacitors, are used as control elements, wherein one capacitor each with a connector makes contact with an electrode, and all capacitors are connected in an electrically conductive manner to one another with their second connector. Contact between the control elements and the electrodes is made in this case usually on a lateral surface of the electrodes. Contact is associated with considerable expenditure. Moreover, the problem arises that with an increasing degree of integration in the case of multi-spark gaps, increasingly thinner electrodes are used. As a result, making contact in particular on the lateral surfaces of the electrodes is further impeded, in particular against the backdrop that necessary insulation intervals must be maintained.

SUMMARY OF THE INVENTION

The object of the invention is to indicate a multi-spark gap in which in a simple way, the individual electrodes of the multi-spark gap are held mechanically and are brought into electrical contact with one another, so that a compact design of the multi-spark gap is made possible.

The multi-spark gap according to the invention has a holding arrangement for mechanical holding and for making electrical contact with the electrodes of the multi-spark gap. To this end, the holding arrangement has at least a first electrically conductive clamping element, a second electrically conductive clamping element, and a first electrically conductive connecting element. The electrodes are arranged between the first clamping element and the second clamping element. The first clamping element makes electrical contact with the first electrode of the multi-spark gap; the second clamping element makes electrical contact with the last electrode of the multi-spark gap. In the state of the art, stacks of disk-shaped electrodes are often used, so that in such an implementation, the clamping elements are arranged on the front side of an electrode stack. The at least first connecting element of the holding arrangement mechanically connects the first clamping element and the second clamping element to one another. Furthermore, the at least first connecting element is electrically insulated from the first clamping element. Moreover, the at least first connecting element and the second clamping element are connected to one another in an electrically conductive manner.

The multi-spark gap according to the invention has a control circuit for controlling the ignition behavior of the multi-spark gap. To this end, the control circuit has multiple electrical control elements with respectively a first control element connector and a second control element connector. One control element each makes electrical contact—at least indirectly—with one electrode each (excluding the first electrode of the multi-spark gap) with its first control element connector. Moreover, the electrical control elements are connected to one another in an electrically conductive manner with their second control element connectors.

The multi-spark gap according to the invention is especially distinguished in that the second control element connectors of the electrical control elements of the control circuit are connected to one another electrically via the at least first connecting element of the holding arrangement.

Electrical contact among the electrodes is considerably simplified by the configuration according to the invention by using at least the first connecting element of the holding arrangement that is present in any case. Thus, a compact design of the multi-spark gap is made possible.

In an especially preferred configuration of the multi-spark gap according to the invention, the second control element connectors of the electrical control elements make contact with the connecting element via contact elements.

A preferred further development of the multi-spark gap according to the invention is characterized in that the contact elements are designed as spring elements. By using spring elements as contact elements, a more reliable electrical contact can be produced in a simple way. In particular, this is possible when the spring elements in a biased state are in the assembled state of the multi-spark gap. According to the invention, it is thus provided in one configuration that the spring elements in a biased state are in the assembled state of the multi-spark gap.

An especially preferred variant of the multi-spark gap is distinguished in that the spring elements can be brought into the biased state by assembling the multi-spark gap via the first connecting element. Thus, the process of making electrical contact is connected directly to the process of the mechanical mounting of the multi-spark gap, so that the required workload is reduced.

In order to facilitate contact among the spring elements and in particular to reduce the damages of the spring elements in mounting, in one configuration of the multi-spark gap according to the invention, the first connecting element has a ramped bias voltage area in the area of an insertion end. When assembling the multi-spark gap, the first connecting element is directed past the spring elements with the bias voltage area in such a way that the spring elements pass along the ramped bias voltage area and are biased.

Especially preferably, the first clamping element and the second clamping element have in each case at least one mounting recess for creating the first connecting element with its insertion end forward.

The first connecting element is especially preferably designed like a pin. Moreover, the connecting element, viewed from an insertion end, has, arranged in succession, an attaching area, a bias voltage area, and a contact area. The attaching area is used to attach the holding arrangement and the multi-spark gap in the assembled state. The attaching area is especially preferably designed as threading. This is advantageous to the extent that the holding arrangement can be attached by means of a screw nut that can be screwed onto the threading. In particular, the distance between the clamping elements can thus be regulated so that the electrodes clamped between the clamping elements can be clamped under optimal tension. The bias voltage area is used, as explained above, for prestressing the contact elements, namely preferably the spring elements during the mounting process. The contact area is used for making contact among the control elements in the assembled state of the multi-spark gap. In particular, the control elements are brought into contact via the contact elements, so that the contact area is used preferably for making contact among the contact elements.

According to the invention, the attaching area has a first cross-sectional area, and the contact area has a second cross-sectional area, wherein the second cross-sectional area of the contact area is larger than the first cross-sectional area of the attaching area. Also, the bias voltage area has a cross-sectional area that is constantly changing in the longitudinal direction of the connecting element, wherein the cross-sectional area of the bias voltage area increases from the first cross-sectional area of the attaching area to the second cross-sectional area of the contact area. By this configuration of the at least first connecting element, the mounting of the multi-spark gap is considerably simplified and made less susceptible to damage of the contact elements. The contact elements in general do not come into contact with the attaching area during the mounting but rather only with the bias voltage area. Because of the widening of the cross-section, prestressing of the contact elements is also done so that irreversible damage, for example by sudden bending, of the contact elements does not occur. The cross-sectional area of the bias voltage area especially preferably steadily increases from the first cross-sectional area of the attaching area to the second cross-sectional area of the contact area. Because of the steady widening of the cross-section, the risk of damage of the contact elements during prestressing is further reduced.

In one variant, the bias voltage area is designed as a chamfer. In an alternative variant, the bias voltage area has a cross section that widens convexly. In an alternative configuration, the bias voltage area has a cross section that widens concavely.

In order to promote the ignition of a multi-spark gap, it is known in the state of the art to provide ignition aids. As ignition aids, for example, ignition electrodes or resistive ignition elements are known from the state of the art. An especially preferred configuration of the multi-spark gap according to the invention has at least one ignition aid. The at least one ignition aid is arranged between the first electrode and the second electrode of the multi-spark gap and is used to ignite the multi-spark gap. In addition, the multi-spark gap has an ignition circuit for controlling the ignition aid. The holding arrangement of the configuration of the multi-spark gap according to the invention has a second electrically conductive connecting element, which mechanically connects the first clamping element and the second clamping element to one another. The second connecting element is insulated electrically from the first clamping element and is, moreover, insulated electrically from the second clamping element. According to the invention, the first connecting element also makes electrical contact with the ignition circuit. Moreover, the second connecting element makes electrical contact with the ignition circuit and the ignition aid.

In a preferred variant of the multi-spark gap according to the invention, the first connecting element has a contacting section for making electrical contact with the ignition circuit. Even more preferably, the contacting section is designed as a connecting element head. In particular, it is provided in a variant that on its side facing the connecting element, the connecting element head forms a contacting surface, which makes electrical contact with the ignition circuit in the assembled state of the holding arrangement. In an additional variant of the multi-spark gap according to the invention, the second connecting element has a contacting section for making electrical contact with the ignition circuit. Even more preferably, the contacting section is designed as a connecting element head. In particular, it is provided in a variant that the connecting element head of the second connecting element forms a contacting surface on its side facing the connecting element, which area makes electrical contact with the ignition circuit in the assembled state of the holding arrangement.

In a preferred variant that has a first connecting element and a second connecting element, the two connecting elements are identically configured.

Especially advantageous is a configuration in which the ignition circuit is arranged on an ignition board and in which the first connecting element and the second connecting element make electrical contact with the ignition board. For easy contact, in a quite especially preferred variant, the ignition board has two recesses, by which the connecting elements are produced in the assembled state of the holding arrangement in such a way that they rest with the contacting surface of the connecting element head on the ignition board and make contact with the ignition circuit.

To make contact with the ignition aid, in a preferred configuration, the ignition aid has a recess through which the second connecting element is run and thus makes electrical contact with the ignition aid.

It is also known from the state of the art to arrange the individual electrodes of a multi-spark gap in holding frames. The holding frames are then stacked on one another with enclosed electrodes. In a preferred variant of the multi-spark gap according to the invention, the electrodes of the multi-spark gap are arranged in holding frames. The holding frames also have first recesses for creating the first connecting element and—if a second connecting element is present—second recesses for creating the second connecting element. Moreover, the contact elements of the control elements extend into the first recesses, so that the first connecting element makes electrical contact with the contact elements in the first recesses.

In order to keep the installation space small, another configuration is characterized in that the control elements are arranged in the holding frame. To this end, one control element is provided per holding frame. Because of this configuration, it is no longer necessary to arrange the control elements on a separate board, which then has to be placed and brought into contact so that, on the one hand, mounting is facilitated, and, on the other hand, installation space is saved, so that a compact multi-spark gap can be achieved.

In particular, there are multiple options for configuring and further developing the multi-spark gap according to the invention. To this end, reference is made to the following description of preferred embodiments with reference to the accompanying drawings.

DETAILED DESCRIPTION OF THE DRAWINGS

Figure 1:
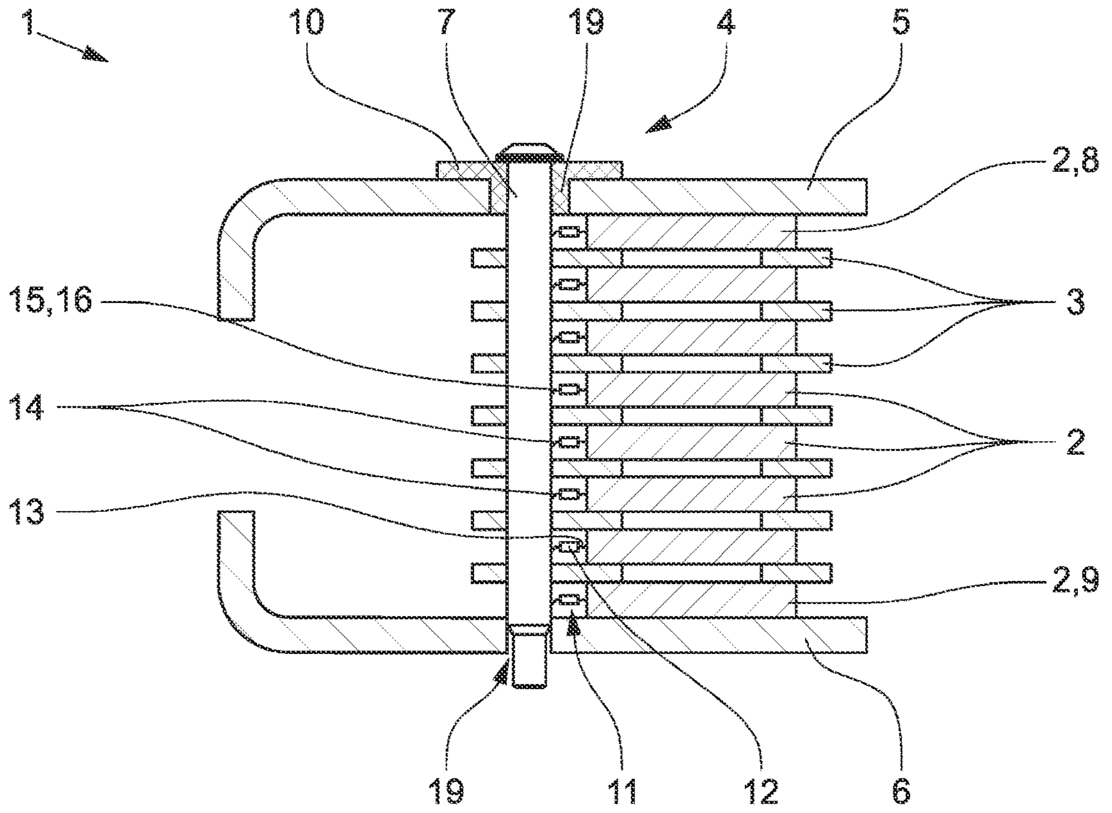
FIG. 1 shows a diagrammatic depiction of a multi-spark gap.

FIG. 1 shows a diagrammatic depiction of a multi-spark gap 1 for an overvoltage protector. The multi-spark gap 1 has multiple electrodes 2. Arranged between the electrodes 2 are insulation elements 3, which are used to insulate the electrodes 2 from one another electrically. Moreover, the multi-spark gap 1 has a holding arrangement 4.

The holding arrangement 4 is used, on the one hand, for mechanical holding of the electrodes 2, and, on the other hand, for making electrical contact with the electrodes 2 of the multi-spark gap 1. The holding arrangement 4 has a first electrically conductive clamping element 5 and a second electrically conductive clamping element 6. Moreover, the holding arrangement 4 has an electrically conductive connecting element 7. The electrodes 2 are arranged between the first clamping element 5 and the second clamping element 6. The first clamping element 5 makes electrical contact with the first electrode 8 of the multi-spark gap 1. The second clamping element 6 makes electrical contact with the last electrode 9 of the multi-spark gap 1. The first connecting element 7 is designed to mechanically connect to one another the first clamping element 5 and the second clamping element 6. The first connecting element 7 and the first clamping element 5 are electrically insulated from one another. To this end, an insulation element 10 is provided, which extends at least partially into the mounting opening of the first clamping element 5. The first connecting element 7 and the second clamping element 6 are connected to one another in an electrically conductive manner. In this case, this is achieved in that both the first connecting element 7 as well as the first clamping element 5 and the second clamping element 6 are produced from an electrically conductive material, in this case a metal. The first connecting element 7 and the second clamping element 6 are in direct tangent contact with one another.

The multi-spark gap 1 has a control circuit 11 for controlling the ignition behavior of the multi-spark gap 1. To this end, the control circuit 11 has multiple electrical control elements 12, which in this case are designed as capacitors. The electrical control elements 12 in each case have a first control element connector 13 and a second control element connector 14. One control element 12 each is brought into electrical contact with one electrode 2 each with its first control element connector 13. Only the first electrode 8 is not connected to a control element 12. All electrical control elements 12 are connected in an electrically conductive manner to their second control element connectors 14. The electrically conductive connection of the second control element connector 14 is carried out via the at least first connecting element 7 of the holding arrangement 4 of the multi-spark gap 1. The holding arrangement 4 thus performs, on the one hand, the function of the mechanical holding of the multi-spark gap 1 and, on the other hand, the function of the electrodes 2 that make electrical contact via the control elements 12 of the control circuit 11. In the depicted embodiment of the multi-spark gap 1, the second control element connectors 14 of the electrical control elements 12 make contact with the first connecting element 7 via contact elements 15. The contact elements 15 are designed as spring elements 16. Moreover, the spring elements 16 are in a biased state in the assembled state of the multi-spark gap 1. The spring elements 16 are brought by the first connecting element 7 into the biased state by assembling the multi-spark gap 1.

Figure 2:
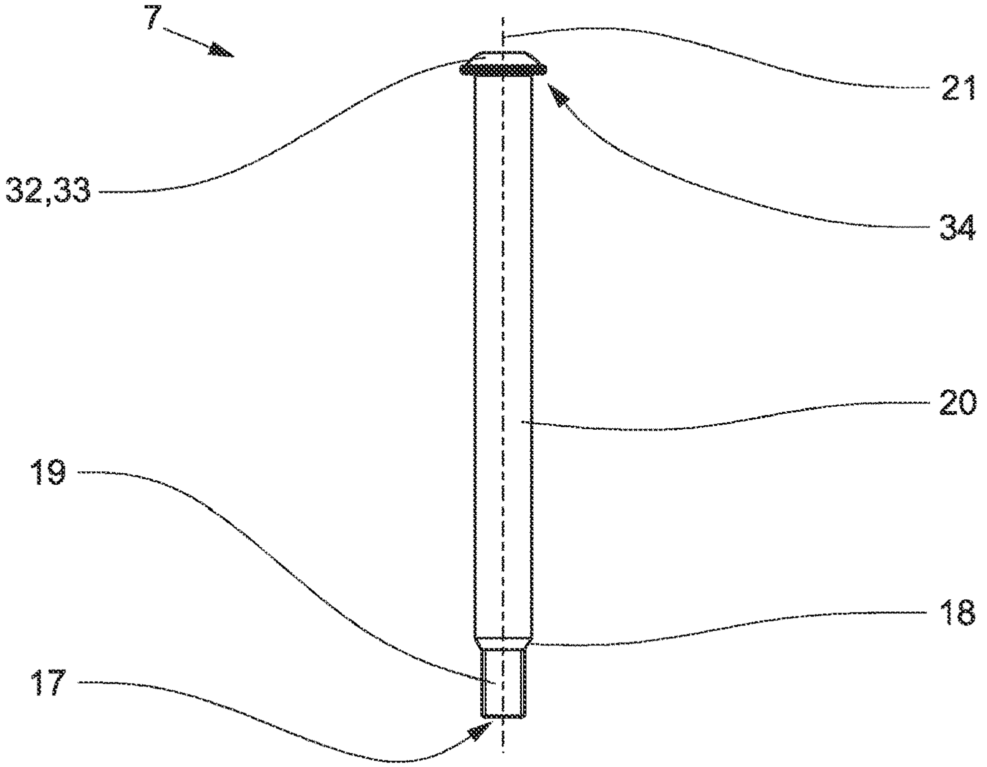
FIG. 2 shows a diagrammatic depiction of a connecting element.

FIG. 2 shows a configuration of a connecting element 7. The connecting element 7 has a ramped bias voltage area 18 on its insertion end 17. When assembling the multi-spark gap 1, the first connecting element 7 with an insertion end 17 is run through mounting recesses by the first clamping element 5 and the second clamping element 6. In this way, when assembling the multi-spark gap 1, the first connecting element 7 is directed past the spring elements 16 with the bias voltage area 18. Because of the ramped configuration of the bias voltage area 18, the spring elements 16 pass along the ramped bias voltage area 18 and are thus biased.

As can be seen from FIG. 2, the first connecting element 7 is designed like a pin. The first connecting element 7, viewed from the insertion end 17, has, arranged in succession, an attaching area 19 for attaching the multi-spark gap 1 in the assembled state, a bias voltage area 18 for prestressing the spring elements 16 in the mounting of the multi-spark gap 1, and a contact area 20 for making contact among the control elements 12 in the assembled state of the multi-spark gap 1. The attaching area 19 has a first cross-sectional area; the contact area 20 has a second cross-sectional area. The second cross-sectional area of the contact area 20 is larger than the first cross-sectional area of the attaching area 19. The bias voltage area 18 has a cross-sectional area that is constantly changing in the longitudinal direction 21 of the connecting element 7. The cross-sectional area of the bias voltage area 18 in this case steadily increases from the first cross-sectional area of the attaching area 19 to the second cross-sectional area of the contact area 20. The attaching area 19 is designed as threading. For attaching the holding arrangement 4 or the multi-spark gap 1, a screw nut 21 is screwed onto the threading of the attaching area 19. This can be seen from, for example, FIG. 5.

Figure 3A:
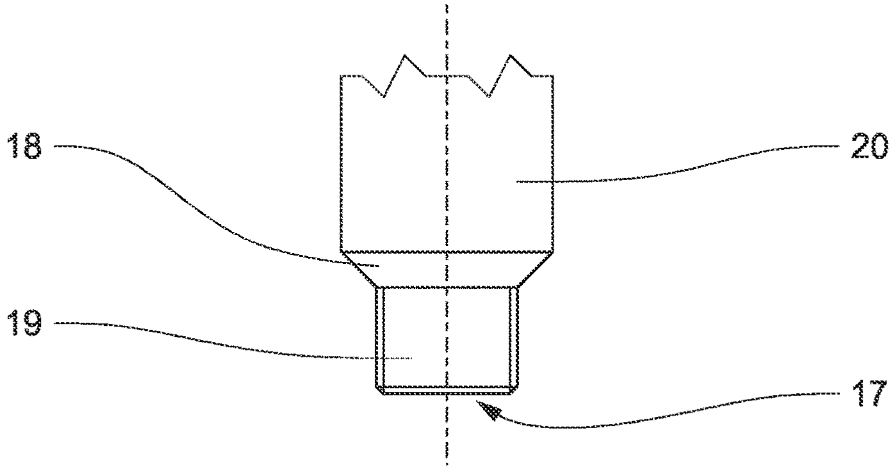
FIGS. 3*a*, 3*b*, and 3*c* show various configurations of the bias voltage area of a connecting element.
Figure 3B:
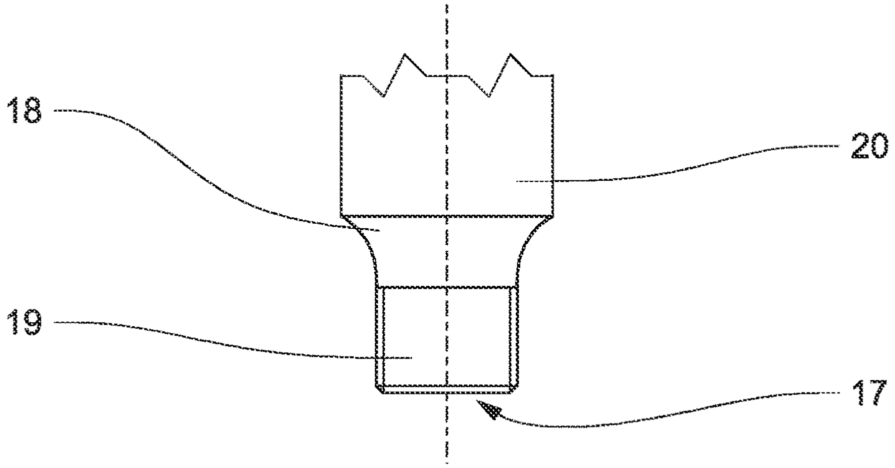
Figure 3C:
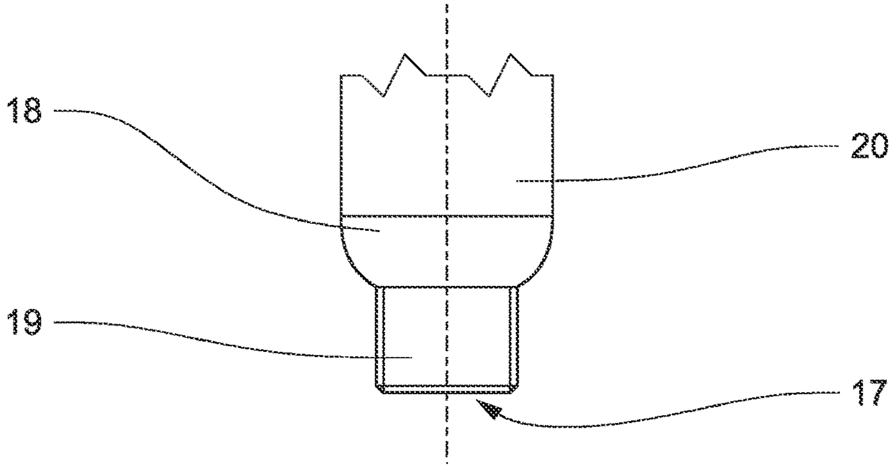

Various configurations of the insertion end 17 of the first connecting element 7 are depicted in FIGS. 3*a*, 3*b*, and 3*c*. In the depicted embodiments, the connecting element 7 has a round cross-section. In FIG. 3*a*, the bias voltage area 18 is designed as a chamfer. In FIG. 3*b*, the bias voltage area 18 is configured in such a way that it has a cross-sectional area that widens concavely. In FIG. 3*c*, however, the bias voltage area 18 is configured in such a way that it has a cross-sectional widening that widens convexly. It is common to all three depicted embodiments that they make possible an especially easy prestressing of the spring elements 16. Because of the steady cross-sectional widening of the bias voltage area from the cross-section of the attaching area 19 to the cross-section of the contact area 20, the spring elements 16 are steadily bent during assembly of the multi-spark gap 1; i.e., sudden bending and thus possible damage to the spring elements 16 do not occur.

Figure 4:
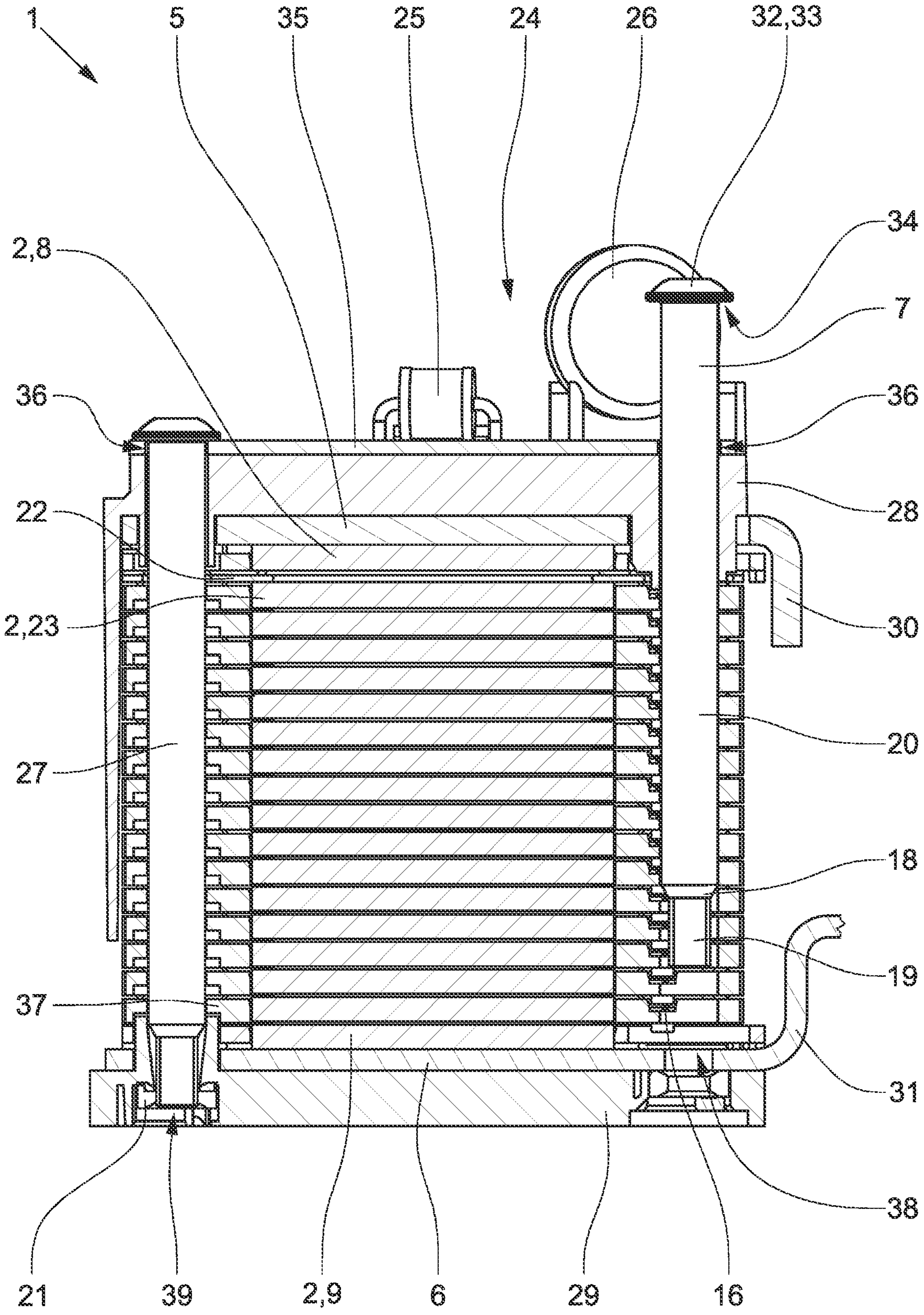
FIG. 4 shows a cross-section through a multi-spark gap.

FIG. 4 shows a cross-section through a second configuration of a multi-spark gap 1. The multi-spark gap 1 depicted in FIG. 4 has additional components in the multi-spark gap 1 depicted in FIG. 1. In particular, the multi-spark gap 1 depicted in FIG. 4 has an ignition aid 22, which is arranged between the first electrode 8 and the second electrode 23 of the multi-spark gap 1. The ignition aid 22 is designed in this case as a resistive ignition element and is used to ignite the multi-spark gap 1. Moreover, the multi-spark gap 1 has an ignition circuit 24 for controlling the ignition aid 22. The ignition circuit 24 in this case comprises a varistor 25 and a gas discharge valve 26, which are connected in series. In addition to the first electrically conductive connecting element 7, this holding arrangement has a second electrically conductive connecting element 27. The second electrically conductive connecting element 27 connects the first clamping element 5 and the second clamping element 6 to one another mechanically. The second connecting element 27 is insulated electrically both from the first clamping element 5 and from the second clamping element 6. To this end, the holding arrangement has a first insulation element 28 and a second insulation element 29. Moreover, the depicted multi-spark gap 1 is configured in such a way that the first connecting element 7 makes electrical contact with the ignition circuit 24.

The second connecting element 27 is arranged in the holding arrangement in such a way that it makes electrical contact with the ignition circuit 24 and the ignition aid 22. The second connecting element 27 thus produces an electrical connection between the ignition circuit 24 and the ignition aid 22. The first electrically conductive connecting element 7 produces an electrically conductive connection between the second clamping element 6 and the ignition circuit 24. Moreover, the first connecting element 7 is used in addition for making electrical contact with the control elements. The control elements are not visible in FIG. 4, but the spring elements 16 are visible, via which the control elements make electrical contact. The first connecting element 7 connects the second control element connector to the control elements electrically. As depicted in FIG. 4, the first clamping element 5 merges into a first connector 30, and the second clamping element also merges into a second connector 31. The connectors 30, 31 are used to connect to a current path that is to be protected.

For making electrical contact with the ignition circuit 24, both the first connecting element 7 and the second connecting element 27 have an ignition circuit contacting section 32. The ignition circuit contacting section 32 is made on the end of the connecting elements 7, 27 opposite to the insertion end 17. The ignition circuit contacting section 32 is designed as a connecting element head 33 and forms a contacting surface 34 on its side facing the connecting element 7, 27, which surface in the assembled state of the multi-spark gap makes electrical contact with the ignition circuit 24. In the depicted configuration, the ignition circuit 24 is arranged on an ignition board 35. The first connecting element 7 and the second connecting element 27 accordingly make electrical contact with the ignition board, wherein to ensure easy contact in this case, the ignition board 35 has two recesses 36, by which the connecting elements 7, 27 are produced in the assembled state of the multi-spark gap. The two connecting elements 7, 27 rest with the contacting surface 34 of the connecting element head 33 on the ignition board 35.

The depicted multi-spark gap 1 has holding frames 37, in which the electrodes 2 are arranged. The holding frames 37 also electrically insulate the electrodes 2 from one another. The holding frames 37 are configured in such a way that they have first recesses 38 for creating the first connecting element 7 and second recesses 39 for creating the second connecting element 27. The contact elements 15, in this case the spring elements 16, of the control elements 12 extend into the first recesses 38 of the holding frame 37, so that the first connecting element 7 makes contact with the contact elements 15 in the recesses 38. In order to produce a multi-spark gap that is especially compact and can be brought into contact easily, the control elements 12 are arranged directly in the holding frame 37. The first connecting element 7 and the second connecting element 27 are attached with screw nuts 21 on their insertion ends 17 in the inserted state. Thus, the tension at which the electrodes 2 are clamped between the clamping elements 5, 6 can also be adjusted.

The first electrically conductive connecting element 7 and the second electrically conductive connecting element 27 are designed identically in this depiction. Moreover, the two connecting elements 7, 27 are arranged on opposite sides of the electrodes 2 in each case. Together with the first clamping element 5 and the second clamping element 6, the connecting elements 7, 27 frame the electrode stack that is formed from the electrodes 2. The first insulation element 28 is arranged on the side of the first clamping element 5 facing away from the electrodes 2. The ignition board 35 is arranged on the side of the first insulation element 28 facing away from the first clamping element 5. The second insulation element 29 is arranged on the side of the second clamping element 6 facing away from the electrodes 2. Moreover, both insulation elements 28, 29 have recesses through which the connecting elements 7, 27 are run.

Figure 5:
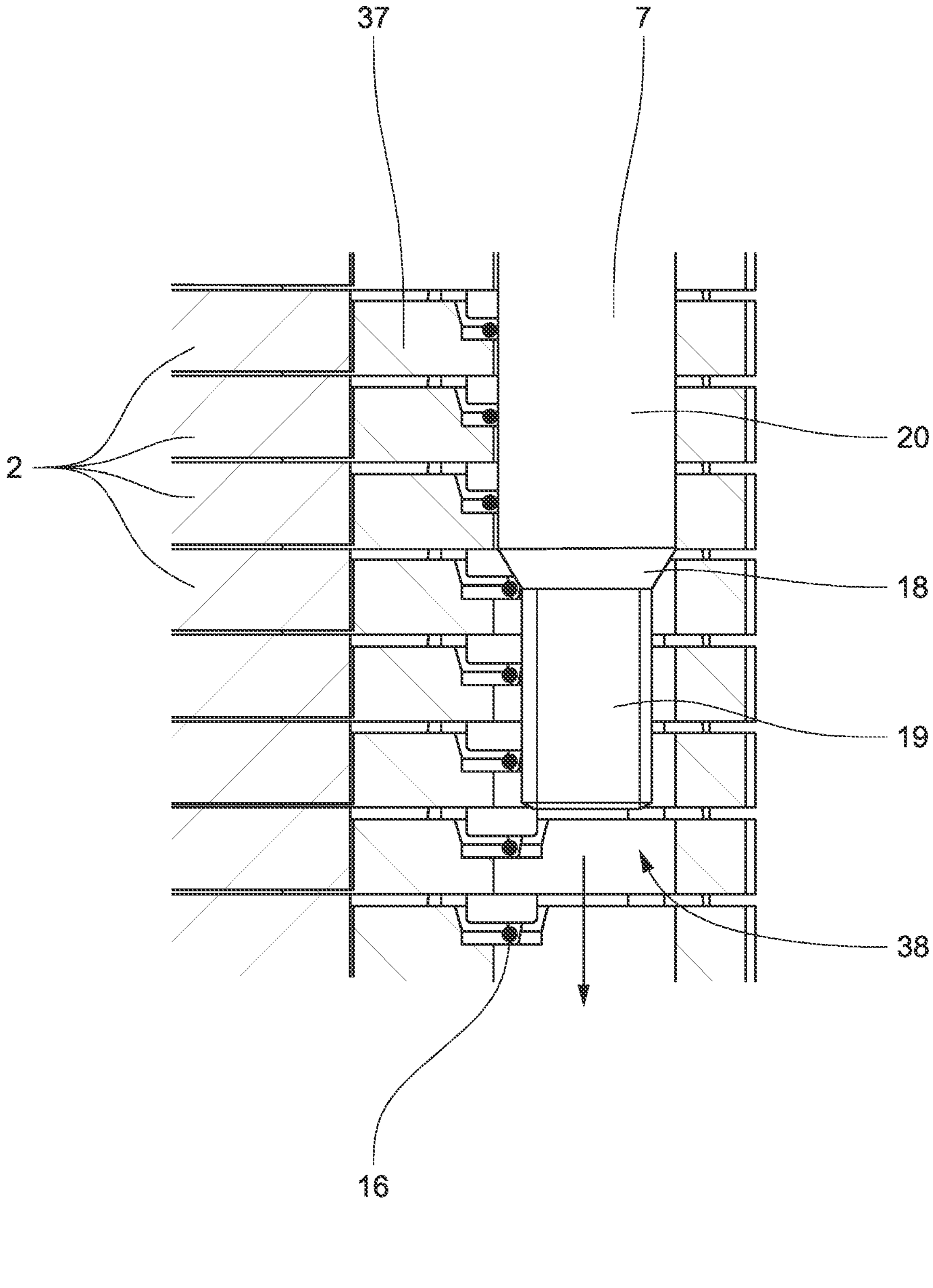
FIG. 5 shows an enlarged cutaway of FIG. 4.

FIG. 5 depicts an enlarged cutaway section of the multi-spark gap 1 of FIG. 4. The electrodes 2 arranged in the holding frame 37 are depicted. Moreover, the spring elements 16 for making electrical contact with the control elements can be seen. Depicted is a snapshot of the mounting process of the multi-spark gap 1, in which the first connecting element 7 is inserted into the recesses 38 of the holding frame. As can be seen especially clearly from FIG. 5, the attaching area 19 of the connecting element 7 has a smaller cross section than the contact area 20 of the connecting element 7. The spring elements 16 are not in contact with the attaching area 19 when the connecting element 7 is inserted; rather, they initially come into contact with the bias voltage area 18. Because of the further insertion of the connecting element 7—the insertion direction of the connecting element 7 is characterized by the arrow—the spring elements 16 pass along the bias voltage area 18 and are thus increasingly biased. Upon contact with the contact area 20, the spring elements 16 are in the biased state. In this way, reliable contact is made.

REFERENCE NUMBERS

1 Multi-spark gap
2 Electrodes
3 Insulation elements
4 Holding arrangement
5 First clamping element
6 Second clamping element
7 First connecting element
8 First electrode
9 Last electrode
10 Insulation element
11 Control circuit
12 Control elements
13 First control element connector
14 Second control element connector
15 Contact elements
16 Spring elements
17 Insertion end
18 Bias voltage area
19 Attaching area
20 Contact area
21 Screw nut
22 Ignition aid
23 Second electrode
24 Ignition circuit
25 Varistor
26 Gas discharge valve
27 Second connecting element
28 First insulation element
29 Second insulation element
30 First connector
31 Second connector
32 Ignition circuit contacting section
33 Connecting element head
34 Contacting surface
35 Ignition board
36 Recesses
37 Holding frame
38 First recesses
39 Second recesses

What is claimed is:

1. A multi-spark gap for an overvoltage protector, with multiple electrodes and insulation elements arranged between the electrodes, comprising:

a holding arrangement for mechanical holding and for making electrical contact with the electrodes of the multi-spark gap, wherein the holding arrangement has at least a first electrically conductive clamping element, a second electrically conductive clamping element, and a first electrically conductive connecting element, wherein the electrodes are arranged between the first clamping element and the second clamping element, wherein the first clamping element makes electrical contact with the first electrode of the multi-spark gap, and wherein the second clamping element makes electrical contact with the last electrode of the multi-spark gap, wherein the at least first connecting element mechanically connects the first clamping element and the second clamping element to one another, wherein the at least first connecting element and the first clamping element are electrically insulated from one another, and the at least first connecting element and the second clamping element are connected to one another in an electrically conductive manner, and a control circuit for controlling the ignition behavior of the multi-spark gap, wherein the control circuit has multiple electrical control elements with respectively a first control element connector and a second control element connector, wherein each control element makes electrical contact with a respective electrode with its first control element connector, and wherein the electrical control elements are connected to one another in an electrically conductive manner by a respective second control element connector, the second control element connectors of the electrical control elements of the control circuit being connected to one another electrically via at least the first connecting element of the holding arrangement.

2. The multi-spark gap according to claim 1, wherein the second control element connectors of the electrical control elements make contact with the first connecting element via contact elements.

3. The multi-spark gap according to claim 2, wherein the contact elements are spring elements, that are in a biased state in an assembled state of the multi-spark gap.

4. The multi-spark gap according to claim 3, wherein the spring elements can be brought into the biased state by assembling the multi-spark gap via the first connecting element, the first connecting element having a ramped bias voltage area on an insertion end, and wherein, when assembling the multi-spark gap with the bias voltage area, the first connecting element is directed past the spring elements in such a way that the spring elements pass along the ramped bias voltage area and are biased.

5. The multi-spark gap according to claim 1, wherein the multi-spark gap has at least one ignition aid, wherein the at least one ignition aid is arranged between the first electrode and the second electrode of the multi-spark gap and is used to ignite the multi-spark gap, wherein the multi-spark gap also has an ignition circuit for controlling the ignition aid, wherein the holding arrangement has a second electrically conductive connecting element that mechanically connects the first clamping element and the second clamping element to one another, the second connecting element being electrically insulated from the first clamping element and is electrically insulated from the second clamping element, and wherein the first connecting element makes electrical contact with the ignition circuit, and the second connecting element makes electrical contact with the ignition circuit and the ignition aid.

6. The multi-spark gap according to claim 5, wherein the first connecting element and/or the second connecting element has/have an ignition circuit contacting section for making electrical contact with the ignition circuit with a connecting element head, that forms a contacting surface on a side facing the connecting element, the contacting surface, in the assembled state of the multi-spark gap, making electrical contact with the ignition circuit.

7. The multi-spark gap according to claim 5, wherein the ignition circuit is arranged on an ignition board and wherein the first connecting element and the second connecting element make electrical contact with the ignition board, wherein the ignition board has two recesses, by which the connecting elements rest with the contacting surface of the connecting element head on the ignition board and make electrical contact with the ignition circuit.

8. The multi-spark gap according to claim 1, wherein the electrodes of the multi-spark gap are arranged in holding frames that have first recesses for creating the first connecting element and second recesses for creating the second connecting element, and wherein the contact elements of the control elements extend into the first recesses of the holding frame, so that the first connecting element makes contact with the contact elements in the first recesses.

9. The multi-spark gap according to claim 8, wherein the control elements are arranged in the holding frame.

10. The multi-spark gap according to claim 1, wherein the first connecting element is pin-shaped, wherein the first connecting element, viewed from an insertion end, has, arranged in succession, an attaching area for attaching the multi-spark gap in an assembled state, a bias voltage area for prestressing the contact elements in the assembled state of the multi-spark gap, and a contact area for making contact with the contact elements in the assembled state of the multi-spark gap, wherein the attaching area has a first cross-sectional area and the contact area has a second cross-sectional area which is larger than the first cross-sectional area of the attaching area, and wherein the bias voltage area has a cross-sectional area that continuously changes in a longitudinal direction of the first connecting element, and wherein the cross-sectional area of the bias voltage area increases from the first cross-sectional area of the attaching area to the second cross-sectional area of the contact area.

* * * * *